United States Patent
Mann et al.

(10) Patent No.: US 9,871,765 B2
(45) Date of Patent: Jan. 16, 2018

(54) DIAMETER FIREWALL USING RECEPTION IP ADDRESS OR PEER IDENTITY

(75) Inventors: Robert A. Mann, Carp (CA); Eric Colaviti, Courcouronnes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 994 days.

(21) Appl. No.: 13/602,608

(22) Filed: Sep. 4, 2012

(65) Prior Publication Data

US 2014/0068748 A1    Mar. 6, 2014

(51) Int. Cl.
G06F 9/00 (2006.01)
G06F 15/16 (2006.01)
G06F 17/00 (2006.01)
H04L 29/06 (2006.01)

(52) U.S. Cl.
CPC ................ *H04L 63/0263* (2013.01)

(58) Field of Classification Search
CPC .................... H04L 63/02; H04L 63/0227
See application file for complete search history.

(56) References Cited

U.S. PATENT DOCUMENTS

| 2009/0307746 A1* | 12/2009 | Di et al. ........................ 726/1 |
| 2011/0007705 A1* | 1/2011 | Buddhikot et al. .......... 370/331 |
| 2011/0126277 A1* | 5/2011 | McCann et al. .............. 726/13 |
| 2011/0200053 A1* | 8/2011 | Kanode ............ H04L 63/0892 370/401 |
| 2013/0235736 A1* | 9/2013 | Khadri et al. ............... 370/250 |

* cited by examiner

*Primary Examiner* — Carl Colin
*Assistant Examiner* — Quy Pham
(74) *Attorney, Agent, or Firm* — Kramer & Amado, P.C.

(57) ABSTRACT

Various exemplary embodiments relate to a method performed by a DIAMETER network node, the method including: receiving a first DIAMETER message; determining that the first DIAMETER message is not trusted; and rejecting the first DIAMETER message.

18 Claims, 4 Drawing Sheets

RULE TABLE: Firewall by Peer Identity ⟵ 300

RULE SETS:
    Diameter Request

IF (Rule Firewall Roaming Partner)
    (Diameter Request.Peer-Origin-Host Equal agent.partnerrealm)
THEN
    RULE TABLE: Roaming Partner Firewall
        IF (Rule Reject Gx)
            (Diameter Request.Application Equal 16777238)
        THEN
            (Diameter Answer.Result-Code.add 3007)
            (Diameter Answer.Error-Message.add No Gx for you)
        ELSE IF (RULE Reject Rx)
            (Diameter Request.Application Equal 16777236)
        THEN
            (Diameter Answer.Result-Code.add 3007)
ELSE IF (Rule Firewall Gateway Network)
    (Diameter Request.Peer-Origin-Host Equal routingagent2.myrealm)
THEN
    RULE TABLE: Gateway Network Firewall
        IF (Rule Reject S9)
            (Diameter Request.Application Equal 16777267)
        THEN
            (Diameter Answer.Result-Code.add 3007)
        ELSE IF (RULE Reject Rx)
            (Diameter Request.Application Equal 16777236)
        THEN
            (Diameter Answer.Result-Code.add 3007)

*FIG. 3*

RULE TABLE: Firewall by IP Address ⟵ 400

RULE SETS:
    Diameter Request

IF (Rule Firewall Roaming Partner)
    (Diameter Request.Reception-Address Equal 138.120.54.19)
THEN
    RULE TABLE: Roaming Partner Firewall
        IF (Rule Reject Gx)
            (Diameter Request.Application Equal 16777238)
        THEN
            (Diameter Answer.Result-Code.add 3007)
            (Diameter Answer.Error-Message.add No Gx for you)
        ELSE IF (RULE Reject Rx)
            (Diameter Request.Application Equal 16777236)
        THEN
            (Diameter Answer.Result-Code.add 3007)
ELSE IF (Rule Firewall Gateway Network)
    (Diameter Request.Reception-Address Equal 192.168.0.11)
THEN
    RULE TABLE: Gateway Network Firewall
        IF (Rule Reject S9)
            (Diameter Request.Application Equal 16777267)
        THEN
            (Diameter Answer.Result-Code.add 3007)
        ELSE IF (RULE Reject Rx)
            (Diameter Request.Application Equal 16777236)
        THEN
            (Diameter Answer.Result-Code.add 3007)

*FIG. 4*

DIAMETER FIREWALL USING RECEPTION IP ADDRESS OR PEER IDENTITY

TECHNICAL FIELD

Various exemplary embodiments disclosed herein relate generally to providing a firewall in DIAMETER networks.

BACKGROUND

DIAMETER networks are widely used today in communication networks. In a DIAMETER network of any significant size, any given device may be typically connected to an agent of some sort (for example, routing, proxying, relay, etc.) and is not connected to the device with which it is interacting. DIAMETER defines the advertising of functionality only to the connected peer. This means that a server does not know whether a device that is requesting service is a legitimate source for such a request. For example, a non-gateway device could send a message pretending to be a gateway in the routing network. By pretending to be something that it is not and by sending invalid requests, a device could wreak havoc in a network.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a DIAMETER network node, the method including: receiving a first DIAMETER message; determining that the first DIAMETER message is not trusted; and rejecting the first DIAMETER message.

Various exemplary embodiments relate to a DIAMETER node, comprising: a DIAMETER interface configured to receive a DIAMETER message; a DIAMETER network information extractor configured to receive DIAMETER firewall information; a diameter stack; a firewall rules engine; and a firewall configured to filter the received DIAMETER messages.

BRIEF DESCRIPTION OF THE DRAWINGS

In order to better understand various exemplary embodiments, reference is made to the accompanying drawings, wherein:

FIG. 3 illustrates an exemplary firewall filtering rule for a firewall based upon peer identity;

FIG. 4 illustrates an exemplary firewall filtering rule for a firewall based upon an input IP address.

To facilitate understanding, identical reference numerals have been used to designate elements having substantially the same or similar structure and/or substantially the same or similar function.

DETAILED DESCRIPTION

The Diameter protocol specification RFC 3588 does not say much about how to defend against invalid requests other than that the route-record attribute value pair (AVP) should be analyzed to confirm that the message travelled an accepted path. Security is typically only done from peer to peer, so any device may be in effect trusting its peers and all of their peers ad infinitum to be trusted. Because of connectivity to roaming partners around the world, use of this method is in effect trusting the entire globe-spanning network.

Figure 1:
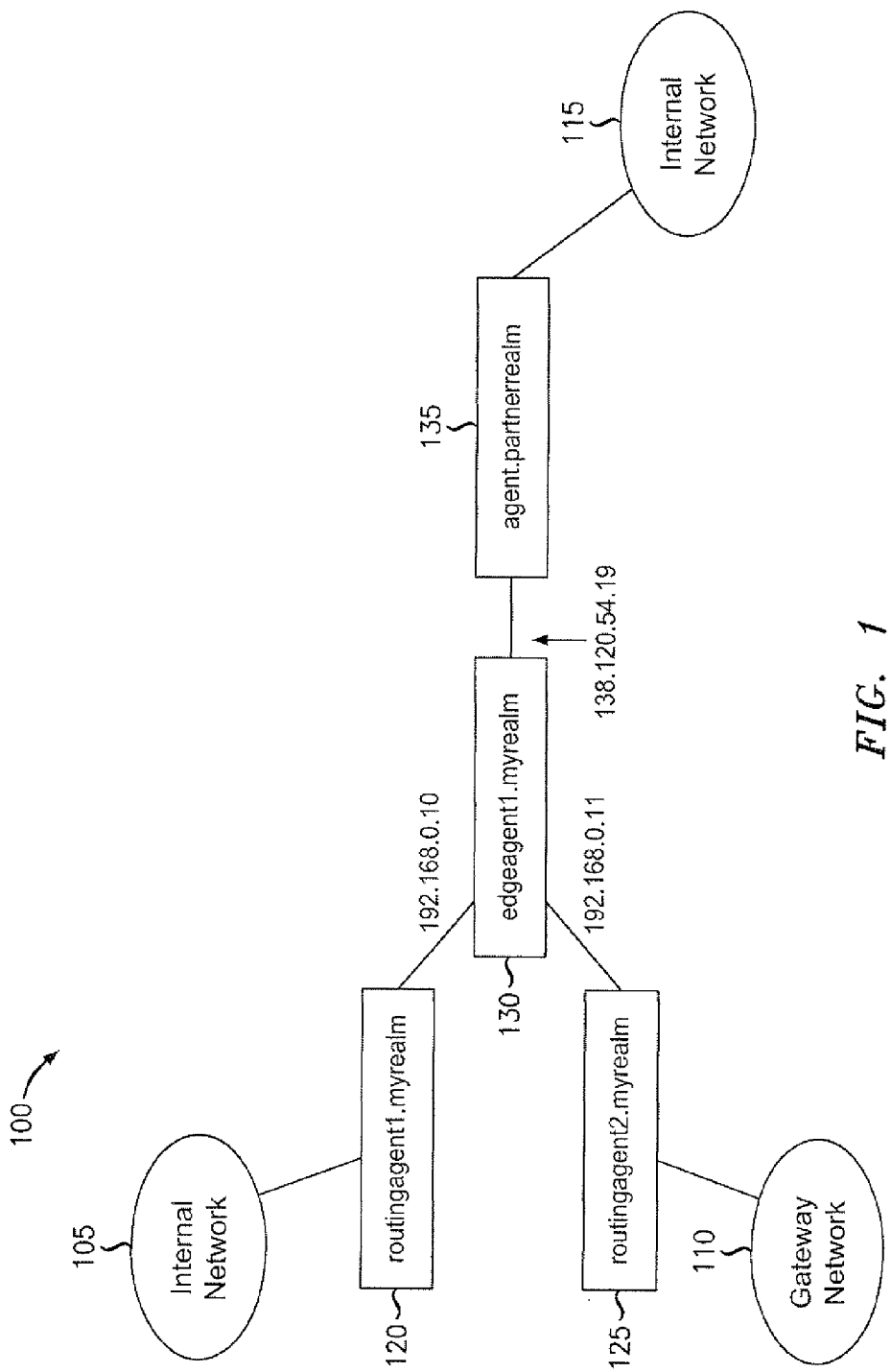
FIG. 1 illustrates an exemplary DIAMETER network using a DIAMETER firewall.

FIG. 1 illustrates an exemplary DIAMETER network using a DIAMETER firewall. The DIAMETER network 100 may include an internal network 105, a gateway network 110, a partner network 115, a first routing agent 120, a second routing agent 125, an edge agent 130, and a partner agent 135. The internal network 105 would generally be trusted as it is under the control of a single network operator. Accordingly, a DIAMETER firewall may not be used within the internal network 105 or for messages received by the first routing agent 120 from the internal network 105. Alternatively, the DIAMETER firewall may be used with the internal network 105 in order to filter out messages. For example, only certain types of messages may be sent within or by the internal network 105. When a message of another type is sent by the internal network, this message may be filtered out because it might be in error or malicious if the internal network is compromised.

The gateway network 110 interfaces with external networks. Accordingly, DIAMETER messages received from the gateway networks 110 may not be trusted. Therefore, the second routing agent 125 may filter out DIAMETER messages from the gateway network 110.

The edge agent 135 may communicate with a partner network 115 via a partner agent 135. Again, because the partner network 115 and the partner agent 135 may not be trusted, the edge agent 130 may filter DIAMETER messages using a DIAMETER firewall.

The following descriptions provide examples of how the DIAMETER firewall may operate in a DIAMETER network. The edge agent 130 may include a DIAMETER firewall. The DIAMETER firewall may filter DIAMETER messages based upon either the input internet protocol (IP) address or peer identity. The edge agent 130 may include three different input IP address: 192.168.0.10; 192.168.0.11; and 138.120.54.19. For example, the DIAMETER firewall may only allow Gx messages to be received at 192.168.0.10, or any other desired group of DIAMETER applications. Alternatively, the DIAMETER firewall may only filter a specific group of DIAMETER applications and allow all other DIAMETER messages to pass. Further, the firewall may also filter messages based upon DIAMETER commands and even specific AVPs within those commands. Also, the filtering may be done based upon any combination of DIAMETER applications, commands, and/or AVPs.

Alternatively, DIAMETER filtering based upon peer identity may be used. The peer identity may identity specific devices, networks, or network segments. For example, filtering may done when the peer identity is from any roaming partner. In another example, filtering may be done when the peer identity is from an internal network. Alternatively, filtering may be based upon a specific roaming partner or group of roaming partners. Further, filtering may further be done based upon any combination of DIAMETER applications, commands, and/or AVPs as described above with respect to filtering based upon input IP address.

Figure 2:
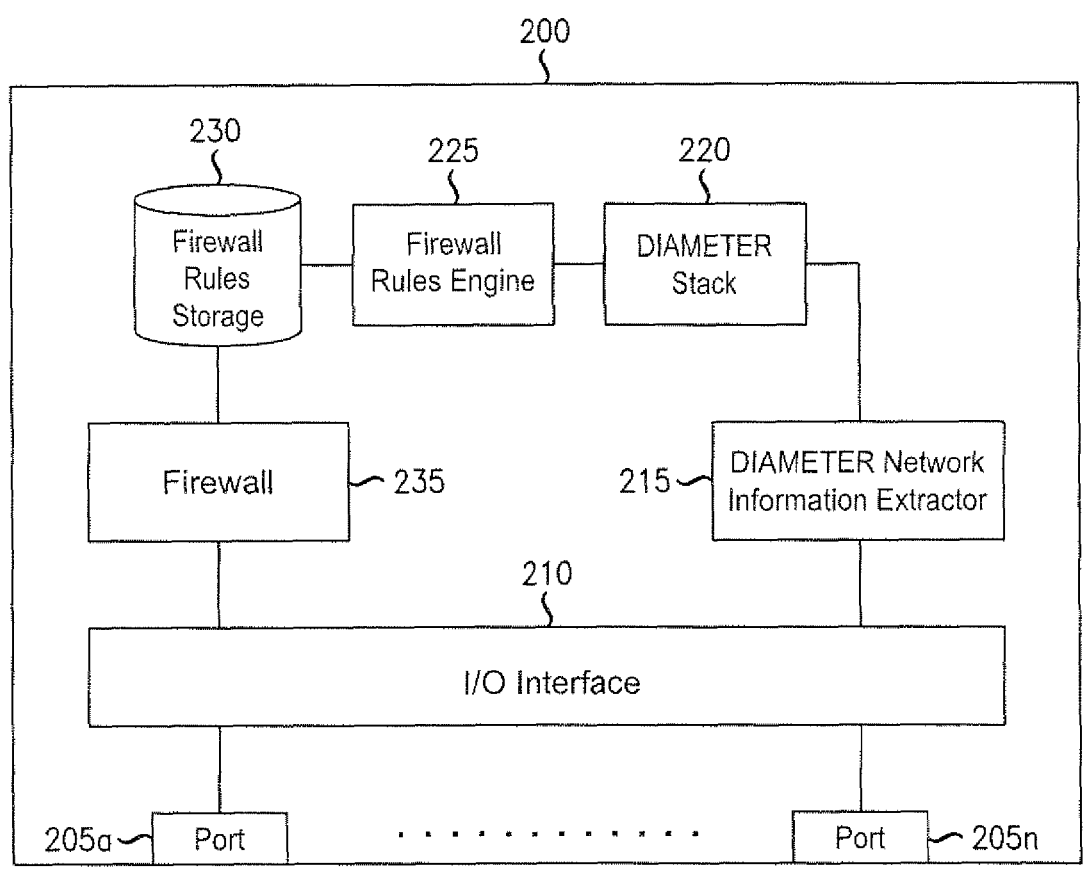
FIG. 2 illustrates an embodiment of a DIAMETER node using a DIAMETER firewall.

FIG. 2 illustrates an embodiment of a DIAMETER node using a DIAMETER firewall. The DIAMETER node 200 may include hardware and/or executable instructions encoded on a machine-readable storage medium configured to implement a DIAMETER firewall. The DIAMETER node 200 may include a plurality of ports 205a-205n, an I/O interface 210, a DIAMETER network information extractor 215, a diameter stack 220, firewall rules engine 225, firewall rules storage 230, and a firewall 235.

The I/O interface 210 may include hardware and/or executable instructions encoded on a machine-readable storage medium configured to interface with ports 205a-205n. The ports 205a-205n in conjunction with the I/O interface 210 may provide the DIAMETER node 200 connectivity to other DIAMETER nodes in the DIAMETER network. The ports 205a-205n may receive DIAMETER messages from other DIAMETER nodes in the DIAMETER network.

The DIAMETER network information extractor 215 may include hardware and/or executable instructions encoded on a machine-readable storage medium configured to extract information used to filter DIAMETER messages by the firewall 235. The DIAMETER network information extractor 215 may receive DIAMETER messages that advertise the functionality of DIAMETER network peers. The advertised functionality may include the DIAMETER applications and commands that the DIAMETER peer may use. Information related to the advertised functionality may be extracted from the DIAMETER message and stored in the DIAMETER stack 220. In addition to the DIAMETER applications and commands, the DIAMETER stack 220 may include information indicating the DIAMETER node input IP address at which the DIAMETER message was received and/or information identifying the peer DIAMETER node.

The DIAMETER stack 220 may be a device that stores information related to DIAMETER peers that interact and communicate with the DIAMETER node 200. Thus, the DIAMETER stack 220 may include a machine-readable storage medium such as read-only memory (ROM), random-access memory (RAM), magnetic disk storage media, optical storage media, flash-memory devices, and/or similar storage media.

The firewall rules engine 225 may include hardware and/or executable instructions encoded on a machine-readable storage medium configured to create firewall filtering rules used by the firewall 235. The firewall rules engine 225 may receive inputs from a user, a network management node, or some other network node that provides information regarding parameters and characteristics related to the type of firewall filtering desired. The firewall rules engine 225 may use these inputs along with information from the diameter stack 220 to create the firewall filtering rules. The firewall engine 225 may also determine what IP addresses are in use by the DIAMETER node 220, as well as topographical information relating to the networks that include the DIAMETER node 220. The firewall filtering rules generated by the firewall rules engine 225 may then be stored in the firewall rules storage 230.

The firewall rules storage 230 may be a device that stores firewall filter rules. Thus, the firewall rules storage 230 may include a machine-readable storage medium such as read-only memory (ROM), random-access memory (RAM), magnetic disk storage media, optical storage media, flash-memory devices, and/or similar storage media.

The DIAMETER firewall 235 may include hardware and/or executable instructions encoded on a machine-readable storage medium configured to implement a DIAMETER firewall using firewall filtering rules that filter DIAMETER messages. The firewall 235 may receive DIAMETER messages via the I/O interface 220 from the ports 225a-225n. The firewall 235 may use information from the received DIAMETER message to determine whether to reject the received DIAMETER message based upon the firewall filtering rules that are in force.

FIG. 3 illustrates an exemplary firewall filtering rule system for a firewall based upon peer identity. The filtering rule system 300 may include a rule table that represents logic used by the firewall 235 to filter DIAMETER messages received by the DIAMETER node 200. The firewall rule system 300 may include a rule set that filters DIAMETER requests. First, the firewall rule system 300 may determine if the Diameter Request.Peer-Origin-Host in the received DIAMETER message indicates that the message is from a roaming partner. If so, then the rule may determine if the application of the DIAMETER request is either a Gx or Rx. If so, then the DIAMETER message is rejected by setting the Diameter Answer result code to indicate that the message is rejected along with an error message indicating the same. Further, the firewall rule system 300 may determine if the Diameter Request.Peer-Origin-Host in the received DIAMETER message indicates that the message is from a routing agent in the same realm as the DIAMETER node 200. If so, the firewall rule 300 may determine if the application of the DIAMETER request is either S9 or Rx. If so, then the DIAMETER message may be rejected by setting the Diameter Answer result code to indicate that the message is rejected along with an error message indicating the same.

FIG. 4 illustrates an exemplary firewall filtering rule system for a firewall based upon an IP address. The filtering rule system 400 is similar to the filtering rule system 300, but instead uses the IP address instead of the peer identity. The firewall rule system 400 may include a rule set that filters DIAMETER requests. First, the firewall rule system 400 may determine if the Diameter_Request.Reception-Address in the received DIAMETER message indicates that the message is received on a specific IP address 138.120.54.19. If so, then the rule may determine if the application of the DIAMETER request is either a Gx or Rx. If so, then the DIAMETER message is rejected by setting the Diameter Answer result code to indicate that the message is rejected along with an error message indicating the same. Further, the firewall rule system 400 may determine if the Diameter_Request.Reception-Address in the received DIAMETER message indicates that the message is received on a specific IP address 192.168.0.11. If so, the firewall rule system 400 may determine if the application of the DIAMETER request is either S9 or Rx. If so, then the DIAMETER message may be rejected by setting the Diameter Answer result code to indicate that the message is rejected along with an error message indicating the same.

The filtering rule system 300 and filtering rule system 400 are just examples of firewall filtering rules that may be implemented. Much more complex rules may be contemplated to carry out more complex filtering schemes. Further, the logic of the rules may also be set to allow receipt of specific types of messages, while rejecting all other types of messages.

Figure 5:
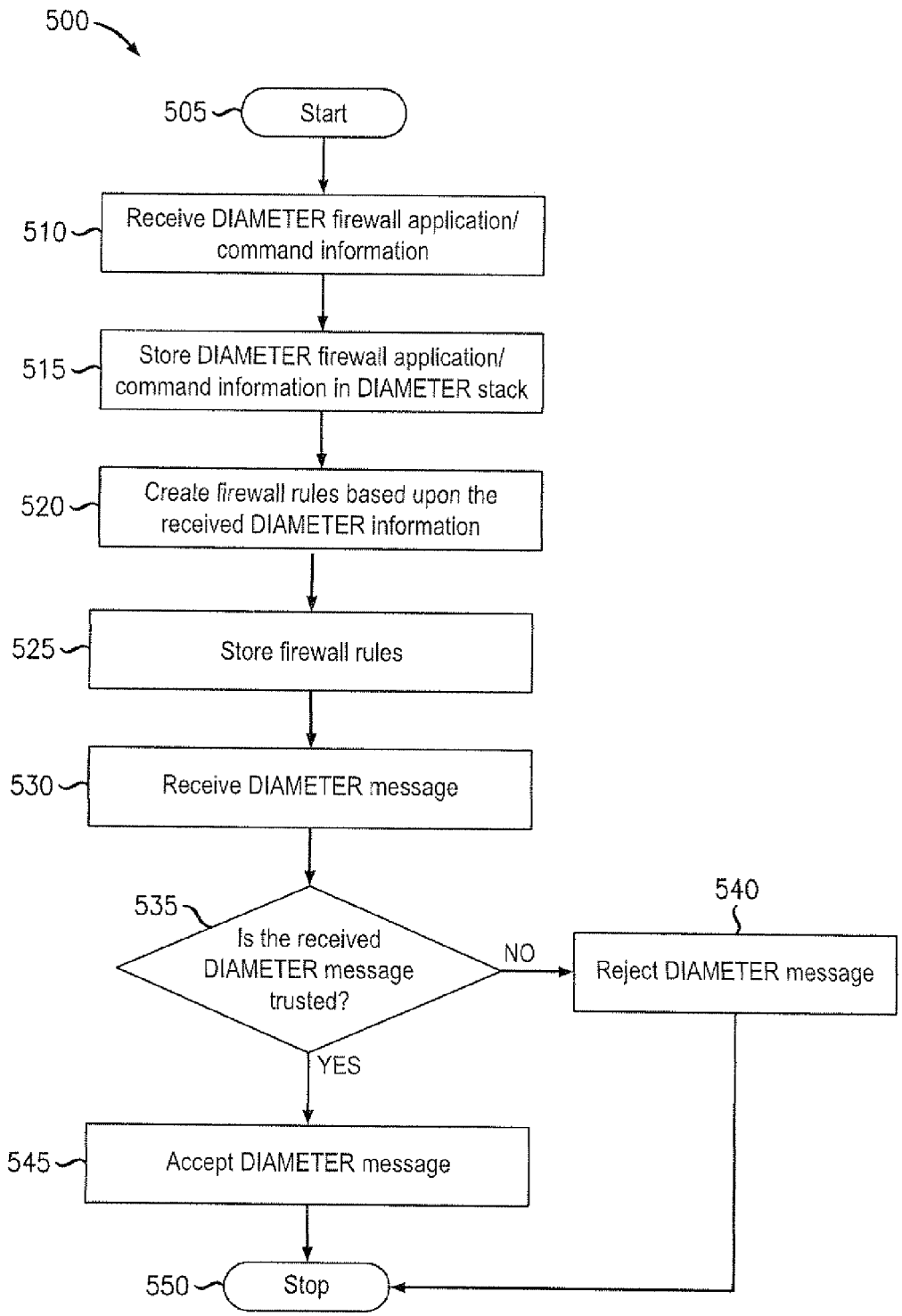
FIG. 5 illustrates a flow diagram illustrating a method of implementing a DIAMETER firewall.

FIG. 5 illustrates a flow diagram illustrating a method of implementing a DIAMETER firewall. The method 500 may start at 505. Next, the method 500 may receive a DIAMETER firewall application or command information 510. Such information may be provisioned by an operator because information advertized by a peer DIAMETER node may not be trusted. Further, such information relating to allowable applications/command may be preloaded in the system. This preloading may be done in the factory or in the field at the time of deployment. The received DIAMETER firewall or application information may then be stored in a diameter stack 515. The method 500 may next create firewall rules based upon the received DIAMETER firewall application or command information 520. The firewall rules may then be stored 525. Next, the method 500 may receive a DIAMETER message from a DIAMETER peer 530. Then the method 500 determines if the DIAMETER message is trusted 535. This determination may be based upon the firewall rules. Further, the determination may be based upon the IP address where the message is received, the peer identity of the message, the type of application, or any other DIAMETER message characteristic or parameter the may be used to filter DIAMETER messages.

If the DIAMETER message is not trusted, then the method 500 may reject the DIAMETER message 540 and then stop 550. If the DIAMETER message is trusted, then the method 500 may accept the DIAMETER message 545 and then stop. The accepted DIAMETER message may be further processed by the DIAMETER node.

In the description of the various embodiments above, certain examples of filtering of DIAMETER messages are disclosed that use certain types of DIAMETER message information. Filtering may also be done at the AVP level in addition to the application and command level or any combination thereof. Such variations and control allow the DIAMETER node 200 to develop any number of simple and/or complex firewall rules to filter incoming DIAMETER messages.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A DIAMETER node, comprising:
   a DIAMETER interface configured to receive a first DIAMETER message;
   a DIAMETER network information extractor configured to extract DIAMETER firewall information from the first DIAMETER message;
   a DIAMETER stack configured to store the extracted DIAMETER firewall information;
   a firewall rules engine configured to create firewall filtering rules from the stored DIAMETER firewall information and store the created firewall filtering rules; and
   a firewall configured to filter the first DIAMETER message based upon the stored firewall filtering rules, wherein the first DIAMETER message is rejected when the first DIAMETER message was sent by a roaming partner and has an application of either Gx or Rx.

2. The DIAMETER node of claim 1, wherein the firewall rules engine is configured to combine the stored DIAMETER firewall information with information regarding parameters and characteristics related to a desired type of firewall filtering to create the firewall filtering rules.

3. The DIAMETER node of claim 2, wherein filtering the first DIAMETER message further comprises:
   determining that the first DIAMETER message is not trusted by applying the created firewall rule to the first DIAMETER message.

4. The DIAMETER node of claim 1, wherein the extracted DIAMETER firewall information is DIAMETER information advertised by a peer DIAMETER node.

5. The DIAMETER node of claim 1, wherein filtering the first DIAMETER message further comprises:
   filtering based upon an IP address of the DIAMETER node where the first DIAMETER message is received.

6. The DIAMETER node of claim 1, wherein filtering the first DIAMETER message further comprises:
   filtering based upon a peer identity of a peer node sending the first DIAMETER message.

7. The DIAMETER node of claim 1, wherein the extracted DIAMETER firewall information includes a DIAMETER command.

8. A method performed by a DIAMETER network node, the method comprising:
   receiving, in a DIAMETER interface, a first DIAMETER message;
   extracting, in a DIAMETER network information extractor, DIAMETER firewall information from the first DIAMETER message;
   storing, in a DIAMETER stack, the extracted DIAMETER firewall information;
   creating, in a firewall rules engine, firewall filtering rules from the stored DIAMETER firewall information;
   storing, in the firewall rules engine, the created firewall filtering rules; and
   filtering, in a firewall, the first DIAMETER message based upon the stored firewall filtering rules, wherein the first DIAMETER message is rejected when the first DIAMETER message was sent by a roaming partner and has an application of either Gx or Rx.

9. The method of claim 8, further comprising:
   receiving, in the DIAMETER interface, a second DIAMETER message;
   determining, in the firewall, that the second DIAMETER message is trusted; and
   accepting the second DIAMETER message.

10. The method of claim 8, wherein the DIAMETER firewall information includes an input internet protocol (IP) address of the network node and an associated DIAMETER application, and further comprising:
    determining that the first DIAMETER message was received at the input IP address of the network node, wherein the first DIAMETER message has an input IP address and a DIAMETER application that both match the IP address and the associated DIAMETER application of the DIAMETER firewall information.

11. The method of claim 8, wherein the DIAMETER firewall information includes an input internet protocol (IP) address of the network node and an associated DIAMETER application and a DIAMETER command, and further comprising:
    determining that the first DIAMETER message was received at the input IP address of the network node, wherein the DIAMETER message has an input IP address, a DIAMETER application, and a DIAMETER command that all match the input IP address and the associated DIAMETER application and the DIAMETER command of the DIAMETER firewall information.

12. The method of claim 8, wherein the DIAMETER firewall information includes a peer identity of the peer node sending the first DIAMETER message and an associated DIAMETER application, and further comprising:

determining that the first DIAMETER message was received from a peer node having a peer identity and a DIAMETER application that both match the peer identity and the associated DIAMETER application of the DIAMETER firewall information.

13. The method of claim 8, wherein the DIAMETER firewall information includes a peer identity of the peer node sending the first DIAMETER message and an associated DIAMETER application and a DIAMETER command, and further comprising:

determining that the first DIAMETER message was received from a peer node having a peer identity, a DIAMETER application, and a DIAMETER command that all match the peer identity and the associated DIAMETER application and the DIAMETER command of the DIAMETER firewall information.

14. The method of claim 8, wherein the received DIAMETER firewall information is produced by an operator.

15. The method of claim 8, wherein the DIAMETER firewall information includes a DIAMETER command.

16. The method of claim 8, wherein the DIAMETER firewall information includes a DIAMETER attribute value pair.

17. A DIAMETER node, comprising:

a DIAMETER interface configured to receive a first DIAMETER message;

a DIAMETER network information extractor configured to extract DIAMETER firewall information from the first DIAMETER message;

a DIAMETER stack configured to store the extracted DIAMETER firewall information;

a firewall rules engine configured to create firewall filtering rules from the stored DIAMETER firewall information and store the created firewall filtering rules; and a firewall configured to filter the first DIAMETER message based upon the stored firewall filtering rules, wherein the first DIAMETER message is rejected when the first DIAMETER message was sent by a routing agent in an identical realm as the DIAMETER node and has an application of either S9 or Rx.

18. A method performed by a DIAMETER network node, the method comprising:

receiving, in a DIAMETER interface, a first DIAMETER message;

extracting, in a DIAMETER network information extractor, DIAMETER firewall information from the first DIAMETER message;

storing, in a DIAMETER stack, the extracted DIAMETER firewall information;

creating, in a firewall rules engine, firewall filtering rules from the stored DIAMETER firewall information;

storing, in the firewall rules engine, the created firewall filtering rules; and filtering, in a firewall, the first DIAMETER message based upon the stored firewall filtering rules, when the first DIAMETER message was sent by a routing agent in an identical realm as the DIAMETER node and has an application of either S9 or Rx.

* * * * *